United States Patent [19]

Alvord et al.

[11] Patent Number: 5,018,011
[45] Date of Patent: May 21, 1991

[54] MONOSTABLE TRIGGER CIRCUIT USABLE WITH HORIZONTAL SYNC PULSES OF EITHER POLARITY

[75] Inventors: Robert J. Alvord, Elmwood Park; Raymond Bambule, Naperville; Roy W. Orr, Jr., Mundelein; Thomas L. Sorensen, Berwyn, all of Ill.

[73] Assignee: Zenith Electronics Corporation, Glenview, Ill.

[21] Appl. No.: 102,692

[22] Filed: Sep. 30, 1987

[51] Int. Cl.$^5$ .............................................. H04N 5/04
[52] U.S. Cl. .................................. 358/148; 358/150; 358/158; 307/273; 328/207
[58] Field of Search ............... 358/148, 149, 152, 153, 358/158, 159, 150; 307/273; 328/207

[56] References Cited

U.S. PATENT DOCUMENTS 3,099,712  7/1963  Meacham ........................... 358/152
3,846,647  11/1974 Tanimoto ............................ 307/273
4,263,615  4/1981  Steinmetz et al. ................. 358/158
4,453,183  6/1984  Balaban et al. ..................... 358/148

Primary Examiner—John W. Shepperd
Assistant Examiner—Michael D. Parker

[57] ABSTRACT

A monostable, that is triggered by either positive or negative polarity horizontal sync pulses, supplies the horizontal deflection system of a monitor. A first transistor of the monostable has its emitter and its base connected through oppositely poled diodes to the horizontal sync input terminal of the monitor. Incoming horizontal sync pulses of either polarity trigger a respective one of the diodes to drive the first transistor into conduction. The time constant of the first transistor is selected to be slightly greater than the duration of the input sync pulses to preclude the monostable triggering on the trailing edge of a sync pulse.

3 Claims, 1 Drawing Sheet

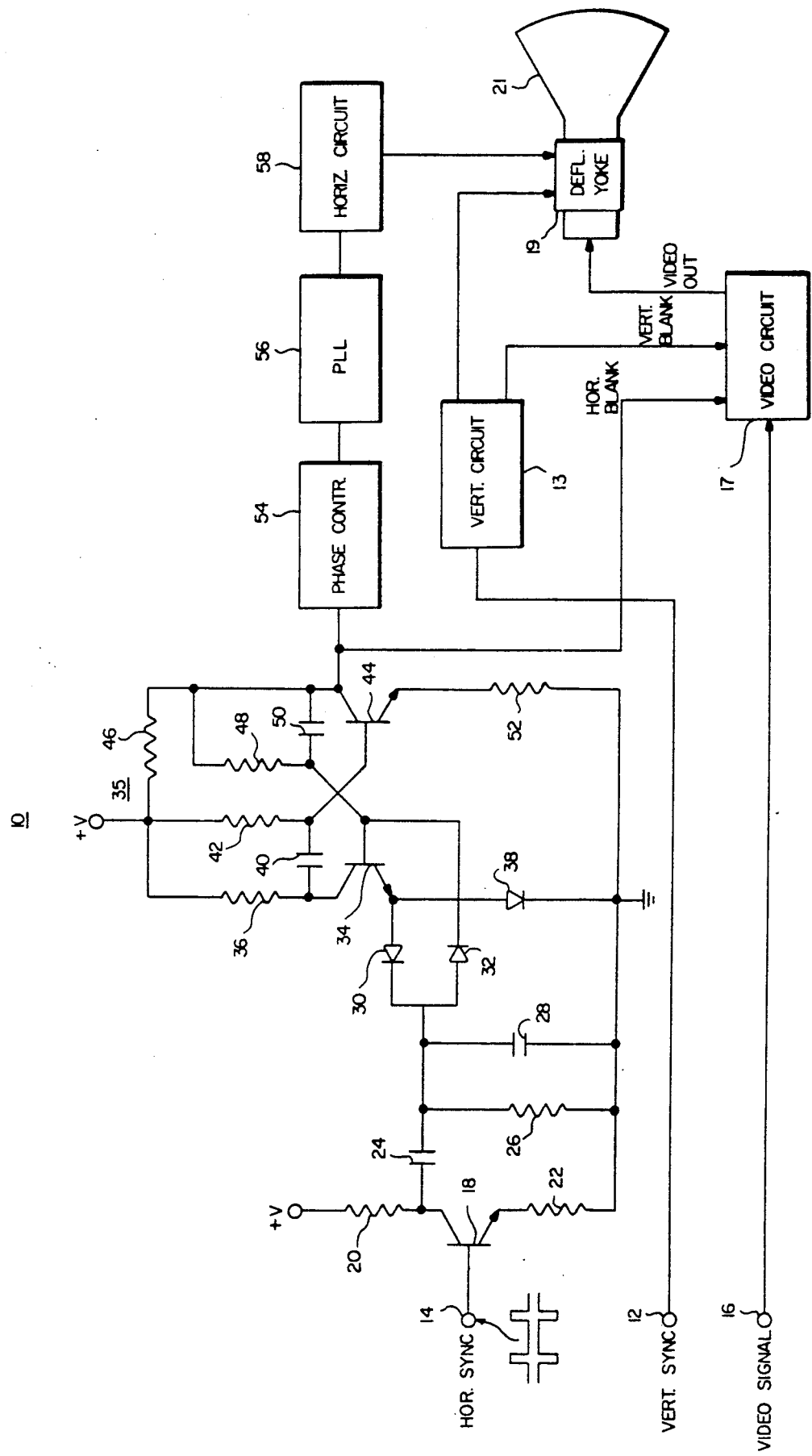

MONOSTABLE TRIGGER CIRCUIT USABLE WITH HORIZONTAL SYNC PULSES OF EITHER POLARITY

BACKGROUND OF THE INVENTION AND PRIOR ART

This invention relates generally to trigger circuits and specifically to trigger circuits for use in horizontal deflection systems of cathode ray tube (CRT) monitors.

Monitors are well-known and include horizontal and vertical deflection circuits for developing a raster by scanning an electron beam over a light-emitting-phosphor covered faceplate of a CRT. Video processing circuits modulate the intensity of the scanned electron beam to produce a video display. Color monitors also are capable of providing a chromatic display rather than a monochrome display and include colored light-emitting phosphors, means for assuring that the electron beam impacts the appropriate color phosphor and color video signal processing circuitry. Color monitors may also include graphics control means for generating and displaying alpha-numeric and graphics video data in response to appropriate control signals.

Some graphics control systems use different horizontal and vertical formats and afford different degrees of resolution. For example, three vertical resolutions, specifically either 350, 400 or 480 vertical lines, are available in some new monitors. Such systems provide for format or mode control signals which may be encoded by the polarities of the accompanying sync pulses. Thus by selecting different polarities of the horizontal and vertical sync pulses, the mode or format of the accompanying data may be determined. In these arrangements, the monitor must be capable of decoding the incoming sync pulses to determine the display format for the data (and any other changeable parameters that may be involved). It is also incumbent upon the monitor to deliver the appropriate polarity of sync signals for which the monitor is designed to operate. The monitor must, therefore, be capable of decoding the incoming sync pulses and producing sync signals of appropriate timing and polarity for controlling its deflection circuits.

In one commercial monitor, a pair of monostables is utilized for enabling internal control of the video display with respect to horizontal deflection. A first monostable is used to introduce a one line delay to permit a phase control to be incorporated for horizontally shifting the video display on the viewing screen. The output of the pair of monostables is applied to a trigger input of a phase lock loop (PLL) that free runs near the horizontal line frequency and which is keyed by the monostables. That circuit is designed for use with and accepts only one polarity of horizontal sync pulses. With the advent of the new computer graphics systems which provide for encoded, that is, either positive or negative polarity horizontal sync pulses, a need arose for a circuit to enable operation of the monostable with either polarity of horizontal sync.

OBJECTS OF THE INVENTION

A principal object of the invention is to provide a novel horizontal sync pulse triggering circuit.

Another object of the invention is to provide an improved monitor.

A further object of the invention is to provide a low cost horizontal sync pulse trigger circuit for a monitor.

BRIEF DESCRIPTION OF THE DRAWING

These and other objects and advantages of the invention will be apparent upon reading the following description in conjunction with the drawing, the single FIGURE of which is a partial schematic diagram of a monitor constructed in accordance with the invention.

DESCRIPTION OF THE PREFERRED EMBODIMENT

Referring to the single FIGURE of the drawing, a monitor constructed in accordance with the invention is generally indicated by reference numeral 10. It includes a vertical sync input terminal 12, a horizontal sync input terminal 14 and a video signal input terminal 16. Terminal 12 is connected to a vertical circuit 13 which includes well-known circuitry and means (not shown) for developing vertical deflection signals and for applying them to appropriate deflection coils (not shown) in a deflection yoke 19, appropriately positioned on the neck of a CRT 21. Video signal input terminal 16 is connected to a video circuit 17 that provides video signals to an electron gun structure (not shown) in CRT 21. Horizontal sync terminal 14, as illustrated by the positive and negative polarity waveforms adjacent thereto, may receive horizontal sync pulses of either polarity. Terminal 14 is connected to the base of a buffer amplifier transistor 18 having a collector load resistor 20 connected to a source of voltage +V and an emitter resistor 22 connected to ground. The collector of transistor 18 is connected through a capacitor 24 to one end of a parallel arrangement of a resistor 26 and a capacitor 28, the other end of which is connected to ground. Capacitor 24 is also connected to the junction of a pair of oppositely poled diodes 30 and 32, specifically to the cathode of diode 30 and to the anode of diode 32.

A monostable 35 comprises a pair of cross coupled transistors 34 and 44. Cross coupled, as used herein, means that the output of one of the monostable transistors is connected to the input of the other monostable transistor and vice versa. The monostable operates in a conventional manner and occupies a normal stable state from which it may be switched by an appropriate input signal. After a time determined by the time constant of the switched transistor, the monostable 35 returns to its normal state. A first transistor 34 of monostable 35 has a collector that is connected to +V through a resistor 36 and an emitter that is connected to the cathode of a bias diode 38. The collector of transistor 34 is also connected, through a capacitor 40, to the base of a second transistor 44. The collector of transistor 44 is connected through a resistor 46 to +V and its emitter is connected to ground through a resistor 52. The collector of transistor 44 is also connected by a capacitor 50 to the base of transistor 34. The base of transistor 44 is connected to +V through a resistor 42 and the base of transistor 34 is connected to the collector of transistor 44 through a resistor 48. The input of the monostable of the invention will be seen to comprise both the emitter and the base of first transistor 34, depending upon the polarity of sync pulse applied, and the output comprises the collector of second transistor 44. The emitter of transistor 34 is connected to the anode of diode 30 and the base of transistor 34 is connected to the cathode of diode 32.

The output of the monostable, e.g., the collector of transistor 44, is connected to a phase control circuit 54 which may comprise another monostable that has a variable RC time constant for adjusting the phase of the horizontal sync signal output. Phase control 54 is connected to a PLL 56 which in turn supplies a horizontal circuit 58 that generates appropriate horizontal deflection signals and applies them to a horizontal winding (not shown) in deflection yoke 19. The output of monostable 35 also supplies a horizontal blanking signal to video circuit 17. A vertical blanking signal is applied to video circuit 17 from vertical circuit 13.

In operation, monostable 35 normally has first transistor 34 in a nonconductive state and second transistor 44 in a conductive state. The collector of transistor 44 (output of monostable 35) is at a voltage level determined by the value of resistor 52 and +V. Upon receipt of an input pulse of sufficient magnitude, transistor 34 is driven conductive and transistor 44 is driven nonconductive. The output voltage level of monostable 35 quickly rises toward +V. Transistor 34 remains conductive for a time determined by the time constant of resistor 36 and capacitor 40 and resumes its original state. At the same time, the collector voltage of transistor 44 falls as transistor 44 resumes its conductive state.

The trigger circuit of the invention operates on either positive or negative polarity horizontal sync pulses. As mentioned, transistor 18 functions as a buffer amplifier and amplifies the input pulses, whether they are positive-going or negative-going. Assuming that a positive-going pulse appears at the junction of diodes 30 and 32 (corresponding to a negative-going horizontal sync pulse at input terminal 14), diode 32 conducts and a positive voltage peak appears at the base of transistor 34, thus driving transistor 34 into conduction and triggering the monostable. After a time determined by the time constant of the RC network associated with transistor 34, the monostable resumes its normal condition with transistor 34 being nonconductive. Therefore, an appropriate horizontal sync signal is applied to phase control circuit 54 and to the horizontal blanking input of video circuit 17.

Should a horizontal sync pulse of opposite polarity be received at input terminal 14, a negative-going pulse appears at the junction of diodes 30 and 32 and diode 30 is driven conductive. This results in a negative voltage peak at the emitter of transistor 34, placing it at a lower potential than its base and driving transistor 34 conductive. Operation continues with transistor 34 resuming its nonconductive state after a time period determined by the values of resistor 36 and capacitor 40. In this connection, the time constant of these elements is selected to be slightly greater than the duration of the input sync pulses to assure that the circuit will not trigger again upon the opposite going edge of the sync pulse. This is a possibility since the circuit triggers on either polarity of sync pulse. Insuring that the time constant of the circuit is slightly greater than the duration of the input sync pulses eliminates this possibility.

The remainder of the circuit operates conventionally. PLL 56 free runs near the horizontal frequency and is precisely controllable in frequency and phase by the sync signal output from monostable 35. It is thus seen that with the circuit, the horizontal sync signal output from monostable 35 has a given polarity irrespective of the polarity of the input horizontal sync pulses. It will also be noted that the trigger circuit of the invention simply involves adding a pair of diodes and presents a very low cost solution for a monitor manufacturer.

It is recognized that numerous changes in the described embodiment of the invention will be apparent to those skilled in the art without departing from its true spirit and scope. The invention is to be limited only as defined in the claims.

What is claimed is:

1. A trigger circuit comprising:
   monostable means having an input terminal and an output terminal and including first and second cross connected transistors, said first transistor having an emitter and a base; and
   input means including a pair of oppositely poled diodes coupled between said input terminal and said emitter and said base of said first transistor for causing said first transistor to change state in response to input signals that are either positive-going or negative-going, whereby an output signal of given polarity is produced at said output terminal, said input signal having a given duration, and the time constant associated with said first transistor of said monostable means being greater than said given duration.

2. A monitor having horizontal deflection means comprising:
   a horizontal input terminal for receiving horizontal sync pulses of either positive or negative polarity;
   monostable means including first and second cross coupled transistors coupled to said horizontal input terminal for applying horizontal sync signals of a given polarity to said horizontal deflection means responsive to said horizontal sync pulses, said first transistor having an emitter and a base;
   a pair of oppositely poled diodes coupled between said horizontal input terminal and said emitter and said base, respectively; and
   said first transistor including means providing a time constant for producing a delay that is greater than the duration of said horizontal sync pulses.

3. A monitor comprising:
   an input terminal for receiving horizontal sync pulses of either positive or negative polarity;
   monostable means including first and second cross coupled transistors;
   a pair of oppositely poled diodes coupled between said first transistor and said input terminal;
   deflection means coupled to the output of said monostable means, said output of said monostable means developing a given polarity horizontal sync signal for said deflection means in response to horizontal sync pulses of either polarity at said input terminal;
   said first transistor including means providing a time constant for producing a delay that is greater than the duration of said horizontal sync pulses.

* * * * *